Sept. 26, 1950          C. HUBECK          2,523,469
TELESCOPING VERNIER GAUGE
Filed Sept. 28, 1945
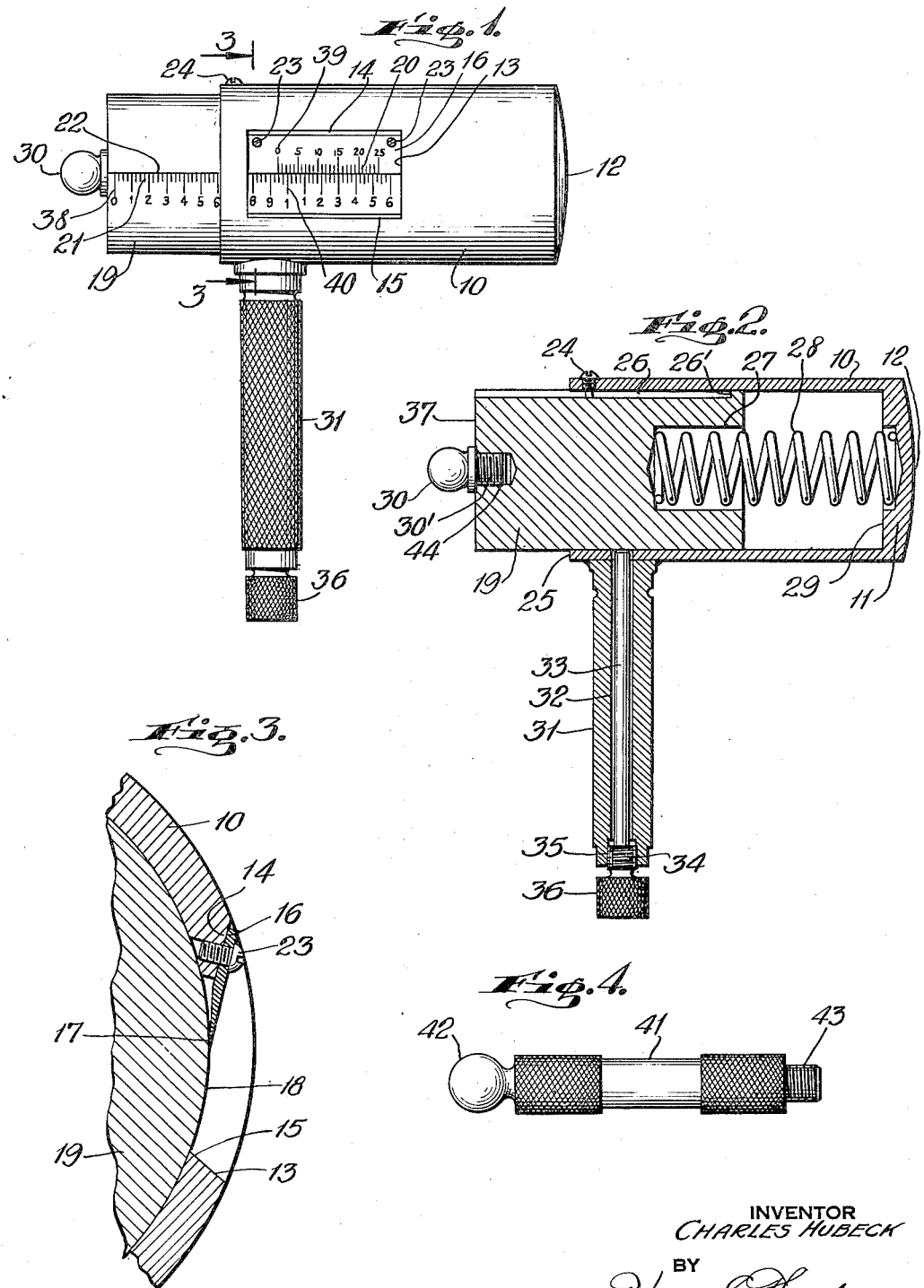
INVENTOR
CHARLES HUBECK
BY
ATTORNEY Patented Sept. 26, 1950

2,523,469

UNITED STATES PATENT OFFICE 2,523,469

TELESCOPING VERNIER GAUGE

Charles Hubeck, New York, N. Y.

Application September 28, 1945, Serial No. 619,083

3 Claims. (Cl. 33—143)

1

This invention relates to what is generally referred to as inside micrometers and telescoping gages, taking the inside dimensions of cylindrical or other members. More particularly, this invention deals with devices of this kind employing a vernier plate countersunk in a cylindrical body and exposed to an opening therein and to scale markings on the surface of a plunger mounted in the cylindrical body, with means for retaining the plunger in different positions of adjustment therein, thus facilitating the taking of accurate internal dimensional readings. The novel features of the invention will be best understood from the following descriptions when taken together with the accompanying drawing, in which certain embodiments of the invention are disclosed, and in which the separate parts are designated by suitable reference characters in each of the views; and in which:

Fig. 1 is a side view of an instrument made according to my invention.

Fig. 2 is a longitudinal sectional view through the instrument.

Fig. 3 is a partial section on the line 3—3 of Fig. 1 on an enlarged scale; and

Fig. 4 is a detailed view of an extension end for the telescoping vernier plunger.

In practice I provide a hollow cylinder or casing 10 having a closed end 11, the outer surface 12 of which is slightly domed for the purpose of taking more accurate readings. One side surface of the cylinder 10 has an elongated opening 13, opposed side walls 14 and 15 of which are bevelled inwardly, the bevel 14 being preferably greater than the bevel 15 so as to expose the surface sufficiently to render a vernier plate 16 clearly visible through the opening 13.

The inner edge 17 of the plate 16 is bevelled to fit snugly upon the outer surface 18 of a vernier plunger 19 so as to bring the scale markings 20 of the plate in close registration with the scale markings 21 along the line 22 of said markings 21, and further so as to dispose the intersecting reading lines substantially centrally of the opening 13, or at least clearly visible in said opening.

Screws 23 are employed to secure the plate 16 in position on the surface 14. A key screw 24 is mounted in the upper surface of the cylinder 10 adjacent the open end 25 thereof, and this screw operates in an elongated recess 26 in the surface 18 of the plunger 19. This maintains the scales in proper registering alinement in movement of the plunger longitudinally of the cylinder 10. The inner end of the cylinder 10 has a spring socket recess 27 engaging one end of the spring 28, and the end 11 of the casing has a socket 29 forming a seat for the other end of the spring, as clearly shown in Fig. 2. Secured centrally of the outer end of the plunger 19 is a ball end plug 30 which forms a measuring finger to engage the inner surface of a device being measured. In other words, the distance measured is that between the surface 12 and the end of the knob or plug 30.

Welded or otherwise secured to the lower end of the cylinder or casing 10 adjacent the end 25 is a handle member 31, preferably knurled to provide a gripping surface. Extending through the handle member is a longitudinal bore 32 in which is arranged a set pin or screw 33 having a threaded end 34 engaging a threaded bore 35 at the outer end of the handle 31. The pin 33 beyond the screw 34 has a knurled fingerpiece or head 36 facilitating the rotation of the screw pin in positively fixing the plunger 19 in the casing after a measurement has been taken, and to maintain the plunger and cylinder against relative movement until the reading on the scale has been made. It will appear from a consideration of Fig. 2 of the drawing that the key slot 26 terminates short of the inner end of the plunger, as at 26', thus checking or limiting outward movement of the plunger with respect to the casing.

When the outer end 37 of the plunger is flush with the end 25, the zero mark 38 on the plunger will register with the zero mark 39 on the plate 16. Then the protruding knob 30 plus the length of the cylinder will designate a definite number of inches or fractions thereof, let us say for example, three inches. Any measurement taken greater than three inches would be measured by the position of the scale 21 with respect to the scale 20 in determining the fractions or decimals of the inch up to the point of the scale marked "1," as at 40 and when this point travels beyond the zero mark 39, the measurements will be four inches or more. In cases where greater measurements are desired, an extension adaptor, as at 41 in Fig. 4 of the drawing can be used and substituted for the plug or knob 30 and this adaptor may add an inch or two inches to the over-all dimensions taken, depending entirely upon the length of the adaptor.

The adaptor 41 has the ball end 42 similar to the stud or plug 30 and a screw threaded end 43 similar to a screw threaded end 30' on the plug 30 to fit the threaded socket 44 of the plunger 19. As scales of the type and kind under consideration are generally known in the art, it will be sufficient to say that the markings zero to twenty-five on the vernier plate occupy the same space as twenty-four divisions on the scale 21 of the plunger 19. In other words, the difference between the width of one of the twenty-five spaces on the scale of the vernier plate and one of the twenty-four spaces on the scale of the plunger is therefore 1/25 of 1/40 or 1/1000 of an inch.

The distinctive features of my present instrument are in the countersunk mounting of the vernier plate in the opening of the cylinder to provide direct registration of the scale 20 of the plate with the central markings 21 of the plunger and in rendering these scale markings clearly visible for reading. Further, an instrument of very simple, economical and practical construction is provided, and by the use of adaptors, such as illustrated in Fig. 4, a single instrument may be utilized in taking accurate measurements in a relatively wide range.

By simply removing the key screw 24, the parts may be quickly detached for cleaning and other purposes to maintain the instrument in free operating condition at all times, particularly if a film of lubricant is maintained between the plunger 19 and the bore of the cylinder. By maintaining the opening 13 at one side of the instrument, in many instances, a reading may be taken with the instrument in position within a hollow member being measured, without utilizing the set screw. In other instances, the set screw will be utilized to fix the parts in their fully extended position, after which the instrument is withdrawn and the reading taken.

Having fully described my invention, what I claim as new and desire to secure by Letters Patent is:

1. An instrument of the class described comprising an elongated cylindrical plunger having scale markings extending longitudinally of the peripheral surface thereof, an elongated casing in which said plunger is slidably mounted, means on the casing and plunger for keying the plunger against rotation in said casing, said casing having an integral closed end wall, a longitudinally elongated opening registering with the scale markings on said plunger and exposing said markings therethrough, one longitudinal wall of the opening in said casing being flatly bevelled, a vernier plate supported on said bevelled wall of the casing, and said plate having an inner bevelled edge arranged tangentially to and seating snugly upon the periphery of said plunger, with said edge terminating in alinement with the scale on said plunger to bring scale markings of the vernier plate in registering alinement with the scale markings of said plunger in the use of said instrument.

2. An instrument of the class described comprising an elongated cylindrical plunger having scale markings extending longitudinally of the peripheral surface thereof, an elongated casing in which said plunger is slidably mounted, means on the casing and plunger for keying the plunger against rotation in said casing, said casing having an integral closed end wall, a longitudinally elongated opening registering with the scale markings on said plunger and exposing said markings therethrough, one longitudinal wall of the opening in said casing being flatly bevelled, a vernier plate supported on said bevelled wall of the casing, said plate having an inner bevelled edge arranged tangentially to and seating snugly upon the periphery of said plunger, with said edge terminating in alinement with the scale on said plunger to bring scale markings of the vernier plate in registering alinement with the scale markings of said plunger in the use of said instrument, a hollow handle member extending angularly to said casing, and means adjustable in the handle member for retaining the plunger and casing in different positions of adjustment one with respect to the other.

3. An instrument of the class described comprising an elongated cylindical plunger having scale markings extending longitudinallly of the peripheral surface thereof an elongated casing in which said plunger is slidably mounted, means on the casing and plunger for keying the plunger against rotation in said casing, said casing having an integral closed end wall, a longitudinally elongated opening registering with the scale markings on said plunger and exposing said markings therethrough, one longitudinal wall of the opening in said casing being flatly bevelled, a vernier plate supported on said bevelled wall of the casing, said plate having an inner bevelled edge arranged tangentially to and seating snugly upon the periphery of said plunger, with said edge terminating in alinement with the scale on said plunger to bring scale markings of the vernier plate in registering alinement with the scale markings of said plunger in the use of said instrument, means for retaining the plunger and casing in different positions of adjustment one with respect to the other, a measuring finger detachable with respect to the outer end portion of said plunger, and a spring between the plunger and said closed end wall for normally extending the plunger in said casing.

CHARLES HUBECK.

REFERENCES CITED

The following references are of record in the file of this patent:

UNITED STATES PATENTS

| Number | Name | Date |
|---|---|---|
| 368,563 | Brown | Aug. 16, 1887 |
| 490,860 | Snoeck | Jan. 31, 1893 |
| 1,307,816 | Garbin | June 24, 1919 |
| 1,638,723 | Barnes | Aug. 9, 1927 |
| 1,789,020 | Parker | Jan. 13, 1931 |
| 2,178,292 | Wogeck | Oct. 31, 1939 |

FOREIGN PATENTS

| Number | Country | Date |
|---|---|---|
| 30,023 | Great Britain | Dec. 31, 1912 |
| 189,118 | Germany | Sept. 26, 1907 |
| 384,995 | France | Feb. 22, 1908 |
| 560,474 | Great Britain | Apr. 5, 1944 |